United States Patent
Daniels et al.

(10) Patent No.: US 12,433,691 B1
(45) Date of Patent: Oct. 7, 2025

(54) MINIMALLY INVASIVE SURGICAL APPARATUS, SYSTEM, AND RELATED METHODS

(71) Applicant: Mariner Endosurgery, Dundas (CA)

(72) Inventors: Michael Daniels, Dundas (CA);
Donald Alan Sawula, Dundas (CA);
Tian Zhang, Dundas (CA)

(73) Assignee: MARINER ENDOSURGERY, Dundas (CA)

( * ) Notice: Subject to any disclaimer, the term of this patent is extended or adjusted under 35 U.S.C. 154(b) by 0 days.

(21) Appl. No.: 18/668,523

(22) Filed: May 20, 2024

Related U.S. Application Data

(60) Provisional application No. 63/575,431, filed on Apr. 5, 2024.

(51) Int. Cl.
| | | |
|---|---|---|
| A61B 34/20 | (2016.01) | |
| A61B 1/00 | (2006.01) | |
| A61B 34/35 | (2016.01) | |

(52) U.S. Cl.
CPC .......... *A61B 34/20* (2016.02); *A61B 1/00087* (2013.01); *A61B 2034/2057* (2016.02); *A61B 2034/2065* (2016.02); *A61B 2034/207* (2016.02); *A61B 34/35* (2016.02); *A61B 2560/0223* (2013.01)

(58) Field of Classification Search
CPC ..... A61B 34/20; A61B 1/00087; A61B 34/35; A61B 2034/2057; A61B 2034/2065; A61B 2034/207; A61B 2560/0223
See application file for complete search history.

(56) References Cited

U.S. PATENT DOCUMENTS

| | | | |
|---|---|---|---|
| 9,492,070 B2 | 11/2016 | Langlois et al. | |
| 10,052,157 B2 | 8/2018 | Frimer et al. | |
| 11,051,897 B2* | 7/2021 | Namiki | A61B 34/10 |
| 11,076,843 B2 | 8/2021 | Langlois | |
| 12,016,522 B2* | 6/2024 | Kokubo | A61B 90/03 |
| 2010/0312095 A1* | 12/2010 | Jenkins | A61B 5/418 |
| | | | 600/411 |
| 2011/0015569 A1* | 1/2011 | Kirschenman | A61B 17/2909 |
| | | | 604/95.01 |
| 2012/0158011 A1* | 6/2012 | Sandhu | A61B 34/30 |
| | | | 606/130 |
| 2014/0081659 A1* | 3/2014 | Nawana | G16H 10/20 |
| | | | 705/3 |

(Continued)

FOREIGN PATENT DOCUMENTS

| | | |
|---|---|---|
| CA | 2716228 C | 5/2018 |
| EP | 3453355 B1 | 6/2024 |

*Primary Examiner* — Anh Tuan T Nguyen
*Assistant Examiner* — Shankar Raj Ghimire
(74) *Attorney, Agent, or Firm* — McDermott Will & Schulte LLP

(57) ABSTRACT

Minimally invasive surgical systems and corresponding methods that can be quickly and accurately calibrated and/or provided in a pre-calibrated manner are disclosed. The systems and method receive an indication designating at least one portion of the surgical site as a safe or a danger zone and display the designated zone(s) on a livestream of the surgical site. The designated zones identify locations where the surgical instrument should avoid (danger zone), or where the surgical instrument is intended to be placed for the surgery or where the one or more surgical instruments can be safely maneuvered (safe zone and dissection zone).

30 Claims, 7 Drawing Sheets

(56) References Cited

U.S. PATENT DOCUMENTS

| | | | |
|---|---|---|---|
| 2014/0163359 A1* | 6/2014 | Sholev | A61B 1/00011 |
| | | | 600/407 |
| 2016/0158938 A1* | 6/2016 | Gombert | B25J 9/1676 |
| | | | 901/30 |
| 2016/0331475 A1* | 11/2016 | Popovic | A61B 1/0016 |
| 2017/0212723 A1* | 7/2017 | Atarot | A61B 34/30 |
| 2018/0271603 A1* | 9/2018 | Nir | A61B 34/25 |
| 2018/0296290 A1* | 10/2018 | Namiki | A61B 1/00009 |
| 2018/0344138 A1* | 12/2018 | Kudo | A61B 18/12 |
| 2019/0125485 A1* | 5/2019 | Usui | A61B 90/50 |
| 2020/0253673 A1* | 8/2020 | Azizian | A61B 34/35 |
| 2020/0281662 A1* | 9/2020 | Cong | A61B 8/481 |
| 2020/0380687 A1* | 12/2020 | Avital | A61B 8/5207 |
| 2021/0141597 A1* | 5/2021 | Atarot | A61B 34/30 |
| 2021/0298795 A1* | 9/2021 | Bowling | B25J 9/1689 |
| 2021/0298845 A1* | 9/2021 | Freiin von Kapri | A61B 34/20 |
| 2021/0322125 A1* | 10/2021 | Kokubo | A61B 1/00193 |
| 2022/0331052 A1 | 10/2022 | Shelton et al. | |
| 2022/0384025 A1* | 12/2022 | Shelton, IV | A61M 21/02 |
| 2022/0409282 A1* | 12/2022 | Shochat | A61B 34/32 |
| 2023/0027687 A1 | 1/2023 | Nokovic et al. | |
| 2023/0215059 A1* | 7/2023 | Ayvali | G06T 17/00 |
| 2023/0405815 A1* | 12/2023 | Yang | A61B 34/20 |

* cited by examiner

MINIMALLY INVASIVE SURGICAL APPARATUS, SYSTEM, AND RELATED METHODS

CROSS-REFERENCE TO RELATED APPLICATIONS

This application claims the priority to and the benefit of U.S. Provisional Patent Application Ser. No. 63/575,431 filed on Apr. 5, 2024. The entire contents of the above-referenced application is hereby incorporated by reference.

FIELD

The present disclosure generally relates to a minimally invasive surgical system, and more particularly the surgical apparatus, system, and related methods for defining safety and/or danger zones within a surgical site and tracking movement(s) of surgical instruments over the defined zones.

BACKGROUND

Intraoperative mistakes and complications in laparoscopic surgeries can be severe. Tracking instrument techniques are used to orient the instrument relative to locations within the body or surgical room to help guide the surgical tool in a procedure. The aim is to prevent inadvertent damage caused by surgical instruments to tissue/organs surrounding the surgical site. However, available techniques are prone to miscalibration and imprecision to the extent that, even in current robotic techniques, damage often occurs. Moreover, available instrument calibration techniques for use in computer aided surgical procedures often require multiple orientation and calibration steps, which can increase the time in the surgical suite and increase the potential for complications. Improved technology is needed, particularly in applications of minimally invasive surgery.

SUMMARY

The present disclosure relates to a minimally invasive surgical system that can be quickly and accurately calibrated and/or provided in a pre-calibrated manner in order to provide precise and detailed guidance to allow the instrument to stay in an intended area of a surgical site during a procedure. The system has a camera equipped surgical tool that provides a livestream of the surgical site and the active movement of one or more instruments being manipulated within the site, as well as a computerized tracking system that receives the livestream of the surgical site provided by the camera equipped surgical tool. The computerized tracking system has a display that visually displays the livestream of the surgical site on the display screen, indicating one or more aspects of the anatomy within the site and a real-time indicator of the one or more surgical instruments within the site. The display can be a wearable display. The system also has a processor coupled to the display, and a memory coupled to the processor. The memory stores a non-transitory computer program that upon execution by the processor enables the processor to receive an indication designating at least one portion of the surgical site displayed in the livestream of the surgical site. That displayed portion defines and indicates one or more three-dimensional zones, which can be one or more zones, each having a defined boundary visible on the display screen. The one or more zones can be configured to identify a place where the one or more surgical instruments should avoid (danger zone), or a place where the one or more surgical instruments is intended to be placed for the surgery or where the one or more surgical instruments can be safely maneuvered (safe zone and dissection zone). In implementations, a zone can be depicted as a danger zone surrounding an unsafe operating region, or a safe-operating zone within which the one or more surgical instruments are intended to pass. Multiple such zones may be depicted, and combinations of safe and danger zones can be depicted. Multiple regions in or about the surgical site may be depicted, with one or more regions depicted as a safe zone, and one or more other regions depicted as a danger zone. The processor can track positioning of the one or more surgical instruments within, about, or with respect to each of the depicted zone(s).

In implementations, the processor can receive confirmation of the depicted three-dimensional zone(s) from a user and respond by altering one or more of dimension(s), orientation(s), and position(s) of the three-dimensional zone(s). The processor uses the input information in combination with real-time video feed at the surgical site to determine the three-dimensional zone. The processor also tracks movement(s) of one or more surgical instrument inserted into the surgical site and if the surgical instrument moves in a vicinity of the three-dimensional danger zone, issues an audio, visual or other warning. The vicinity can be set as a pre-determined parameter, for example a distance from a boundary of the zone. The processor can also receive confirmation of a defined three-dimensional safe zone, track movement(s) of a surgical instrument inserted into the surgical site, and issue a signal (e.g., by a color-coded region of a display screen) when the surgical instrument is within that intended zone and issue a warning if the surgical instrument moves outside that zone or near a boundary thereof. The defined zones are determined and depicted in real-time and can be adjusted during the course of a procedure (e.g., as the surgical instrument moves within the surgical site).

The system can be implemented into a robotic surgery platform with quick calibration and/or pre-calibration. In implementations, the system can connect to such a platform, receive input information from the platform indicative of one or more parameters of the robot, and integrate that information into the system's memory. The integration of system with such platform can be done quickly, particularly where the platform has already been calibrated (pre-calibrated) within the surgical room, in terms of its position, orientation, physical dimensions or other parameters. The system is quickly calibrated to the robot (e.g., automatically, by touching an icon on a display screen of the system, or by touching a divot or other position on the robot) and/or pre-calibrated (e.g., robotic system is factory calibrated to register and track location(s) of the elements (e.g., graspers) of the robotic system that are used to manipulate surgical tools). The system can then receive input information from the platform about the robot and its positioning and orientation and can use that information in combination with the real-time video feed at the surgical site to determine one or more safe and danger zones within the surgical site and display the one or more zones in augmented reality over along with the real-time video feed.

In implementations, a minimally invasive surgical system comprises a camera equipped surgical tool that provides a livestream of a surgical site upon insertion into the surgical site and a computerized tracking system that receives the livestream of the surgical site provided by the camera equipped surgical tool. The computerized tracking system includes a display that displays the livestream of the surgical site on the display screen, a processor coupled to the display, and a memory coupled to the processor. The memory stores a non-transitory computer program that upon execution by the processor enables the processor to receive an indication designating at least one portion of the surgical site displayed in the livestream of the surgical site as a designated zone, define a three-dimensional zone surrounding the designated zone, and display the three-dimensional zone in augmented reality along with the livestream of the surgical site such that three-dimensional zone has a defined boundary visible on the display. The processor tracks movement of a surgical instrument within the surgical site with respect to the three-dimensional zone.

Methods are provided for configuring the system for operation with a robot, including receiving data indicative of a position of a surgical instrument operated by the robot; creating, using the processor, a three-dimensional zone indicative of a safe or danger region of a surgical site, using the robot to advance the surgical instrument within the surgical site, and issuing a signal in the event the surgical instrument reaches a pre-determined vicinity of a boundary of a zone.

Further, methods are provided for receiving a livestream of surgical site via a camera equipped surgical tool, receiving an indication designating at least one portion of the surgical site as an unsafe or safe operating region, defining a three-dimensional zone surrounding the at least one portion, augmenting the defined three-dimensional zone with the livestream of the surgical site, presenting the defined three-dimensional zone as augmented with the livestream zone on a display, and tracking movements of a surgical instrument within the surgical site and providing a signal if the surgical instrument moves in a vicinity of the defined three-dimensional zone.

Methods are also provided for configuring the system for operation with a robot and using the system as so configured. For example, at an initial point in time, the system can receive information about parameters indicating one or more parameters of the robot, for example that the robot has an arm of a given length, is oriented at a given angle, holds a tool of a given profile at a given angle, and is positioned in the surgical room in a given place. The system can also receive updated information as a result of adjustments and alterations of such parameters, as the surgical instrument moves during the procedure or is otherwise adjusted. Additionally or alternatively, the robotic surgical system can be pre-calibrated and configured to register the position and orientation of its own arm(s) within the surgical room, such that the system can track the movements of the robotic arm(s) within the surgical room and report real-time information regarding the position and orientation of its arm(s) to system.

Using that information, the system can quickly track the position, orientation and other parameters of the robot's arm and the surgical instrument within the surgical site as indicated in the video feed and can display that information (within the feed) for viewing in real time by the surgeon. Based on that viewed information, the surgeon can provide inputs via the display (e.g., via touch screen or via voice or eye control or hand gestures) to identify various zones within the site and indicate (e.g., on the display) the intended and danger zones. For a given zone, that indication can be done, for example, by drawing a partial or complete zone boundary about a depicted region on the touch screen, or by depicting a point on the touchscreen that is then auto filled into a multi-dimensional zone. In implementations, the indication can be a depth of three-dimensional danger zone.

The processor tracks the movement of the surgical instrument within the surgical site and provides the signal in response to detecting the surgical instrument within or near a boundary of the three-dimensional zone. The three-dimensional zone can comprise at least one danger zone, and the signal is a warning indicating it is unsafe to move a surgical instrument into a position in the surgical site corresponding to the danger zone. Alternatively or additionally, the three-dimensional zone can comprise an intended zone, and the signal indicates a safe zone where it is intended for the instrument to be positioned within the intended zone. Further, the processor can indicate a change in the safe zone signal when the instrument approaches a boundary of the intended zone. The safe zone indicator is removed when the instrument departs the intended zone.

In implementations, the processor can activate a danger mode upon issuance of the warning. Further, the processor can inactivate the danger mode in response to the surgical instrument moving outside of the boundary of the three-dimensional danger zone. Furthermore, the processor can indicate multiple three-dimensional zones. The multiple three-dimensional zones can comprise a first zone indicative of a danger zone and a second zone indicative of an intended zone. The processor can further adjust a dimension of the three-dimensional zone(s) in real-time during a surgical procedure. For example, the processor can adjust position and orientation of the multiple three-dimensional zones in real-time during a surgical procedure. Furthermore, a shape database can be used to store one or more predefined shapes for application to the three-dimensional zone. The dimension of the three-dimensional zone is indicated on the display screen as having a shape. For example, the one or more pre-defined shapes can be at least one of a sphere, a pyramid, a cone, a cube, a sphere, a cylinder, or a combination thereof. Alternatively or additionally, an organ model database that stores one or more models of organs known to be present in proximity of the surgical site can be utilized. The pre-defined shape can be at least one model from the one or more models of organs and the processor can present a menu comprising one or more predefined shapes and receive a selection of at least one shape. Additionally or alternatively, an organ image database can be utilized. The organ image database stores one or more two-dimensional images of organs known to be present in proximity of the surgical site and corresponding three-dimensional models for each two-dimensional image. The processor correlates the two-dimensional region to at least one image in the image database, determines a corresponding three-dimensional model for the at least one image, and defines the three-dimensional danger zone using the three-dimensional model. In implementations, the at least one of the one or more two-dimensional images can be an image previously obtained from a subject using an imaging system. The imaging system can be at least one of an ultrasound system, a magnetic resonance imaging system, or a computerized tomography system.

Further, the processor can modify a three-dimensional volume or other parameter(s) of the three-dimensional zone in response to receiving relevant instructions. The relevant instructions can comprise identification of an additional unsafe or safe operating region and be optionally provided by actuation on the display screen.

The processor can define the three-dimensional zone based on an interpretation of a two-dimensional image. For example, the processor can define a two-dimensional region surrounding the marker on the two-dimensional image and define the three-dimensional zone based the interpretation of the two-dimensional region. Additionally or alternatively, the processor can define the two-dimensional region with the marker at a center of the two-dimensional region. Further, the system can rely on prior information and artificial intelligence, such as prior information obtained from the database and/or prior information learned from prior surgical tasks to designate the safe or danger surgical regions.

In implementations, the processor can be actuatable to define the three-dimensional zone by one or more of touchscreen actuation on the display and voice actuation. Additionally or alternatively, the processor can be actuatable to define the three-dimensional zone by eye movement and/or hand gestures by a wearer of the wearable display.

Additionally or alternatively, a probe can be used to provide the indication designating the at least one portion of the surgical site displayed in the livestream of the surgical site as an unsafe operating region. The probe can be a probe that is inserted into the surgical site. In implementations, the probe has a scanner that scans the surgical site to provide the indication designating the at least one portion of the surgical site displayed in the livestream of the surgical site as an unsafe or safe operating region. The scanner can be at least one of a sonar and a three-dimensional ultrasound scanner.

The systems and methods disclosed herein can be integrated into a robotic surgery platform that includes a robot. The robot can have one or more position, orientation, physical dimension or other parameters that can be detected. The system is configured to receive input information from the robotic surgery platform indicative of one or more parameters of the robot and integrate that information into the memory. Further, the system can be calibrated to the robot. For example, calibration occurs automatically upon integration of the system and robotic platform and/or by actuation of a touch screen or divot. The calibration can be based on one or more robot parameters selected from position of the robot, length of robot arm, orientation of arm, arm angle, length of tool held by the robot, profile of the tool. Further, the processor can receive updated information about the robot parameters in real-time as the instrument moves during the procedure or is otherwise adjusted.

In implementations, the aspects above, or any system, method, apparatus described herein, can include one or more of the features disclosed herein. Other aspects and advantages of the disclosure will be apparent from the following drawings and description, all of which illustrate the various aspects of the inventions disclosed herein, by way of example only.

BRIEF DESCRIPTION OF THE DRAWINGS

A detailed description of various embodiments is provided herein below with reference, by way of example, to the following drawings. It will be understood that the drawings are exemplary only and that all reference to the drawings is made for the purpose of illustration only and is not intended to limit the scope of the embodiments described herein below in any way. For convenience, reference numerals may also be repeated (with or without an offset) throughout the figures to indicate analogous components or features.

Figure 1A:
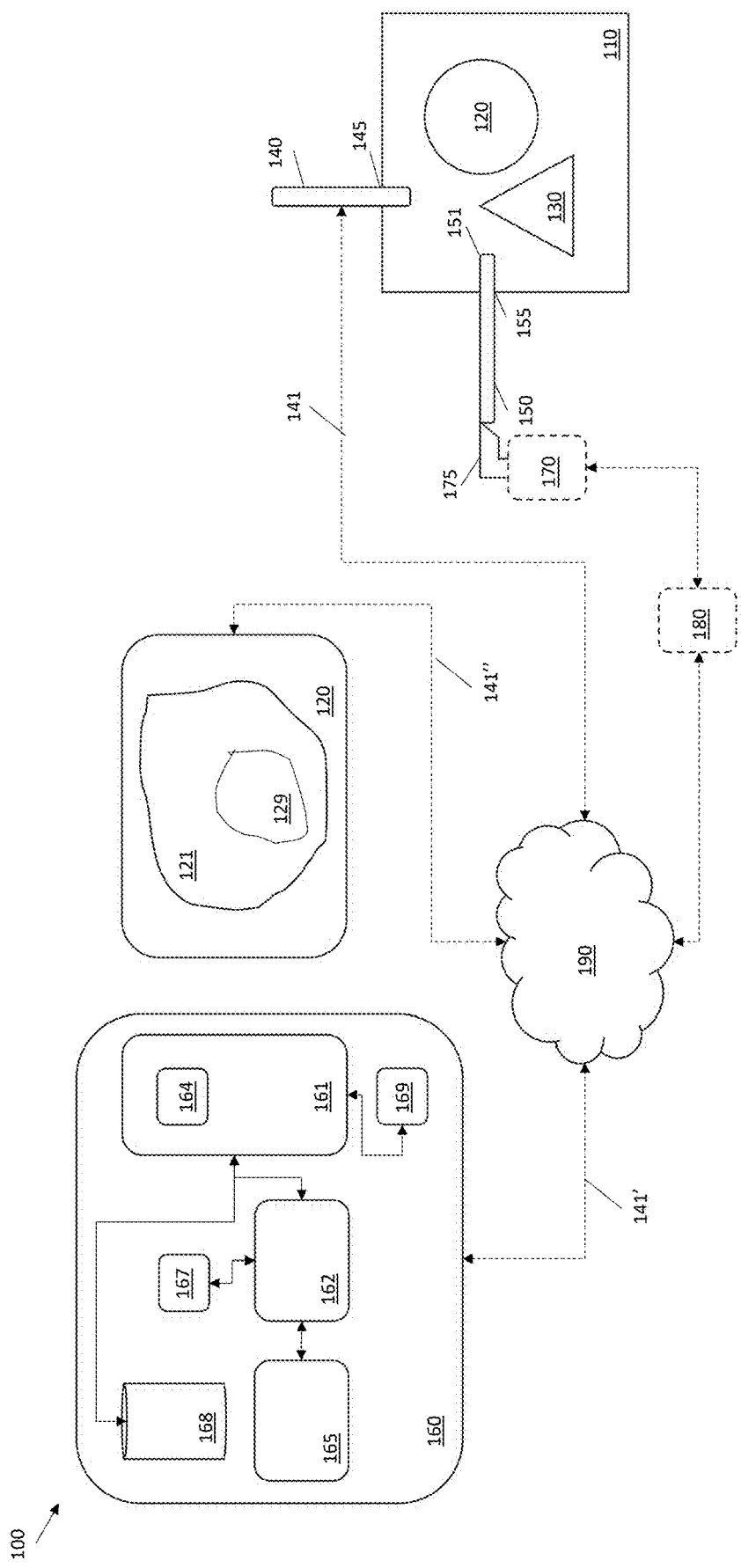
FIG. 1A is a high-level schematic illustration of minimally invasive surgical system according to some embodiments disclosed herein.

Other applications of the technology can also be made, as will be appreciated from the following discussion of embodiments.

DETAILED DESCRIPTION

The present disclosure generally relates to a minimally invasive surgical system, and more particularly the surgical apparatus, system, and related methods for defining safety and/or danger zones within a surgical site and tracking movement(s) of surgical instruments over the defined zones. The disclosed systems, apparatus, and methods help surgical and residency training programs reduce the likelihood of unintended adverse events during laparoscopic procedures by addressing visual spatial, depth perception and localization challenges. For example, embodiments disclosed herein allow surgeons to define and adjust patient-specific safety and/or danger zones within a procedural area in real time during a surgical procedure. Once the safety and/or danger zones are defined, the disclosed embodiments track any surgical instruments used in the surgical procedure and notify the user of any deviations into or out of the zones by tracking instrument locations within the patient's body.

Identifying the presence of safe and danger zones within the surgical site helps ensure that the working (i.e., surgical) area is identifiable and enables annotation of an area within the surgical site to represent the surgical site. Equipped with an accurate depiction of the safe and danger zones, a surgeon (e.g., a robotic surgical system operator) can more accurately maneuver the surgical instrument within the surgical site. Annotating danger zones allows the system to notify the surgeon if/when an instrument deviates into an area that should be avoided, or when a risk of reaching that area increases (e.g. in comparison to a pre-set threshold). Annotating safe zones allows the surgeon to quickly check (e.g., by looking at a color code on a display screen region) to confirm that the instrument is in the correct surgical position and moving accurately along a pre-determined surgical path within the site, and also allows the system to notify the surgeon if/when the instrument deviates from the zone or moves toward a defined boundary of the zone. Embodiments disclosed herein allow accurate annotation of one or more such zones during a procedure in an efficient manner, preferably without the need for extensive calibration. It also allows the depiction of multiple zones in a given surgical site, with it being possible to depict them simultaneously on a viewing screen for a surgeon during a procedure at the surgical site. For example, in one implementation, multiple (e.g., 4 or more) danger zones can be identified in a surgical site, or multiple safe zones, or multiple mixed zones may be depicted with one or more safe zones and one or more danger zones.

The disclosed systems can be configured so that various features (e.g., shape, position, dimension, and presence) of the safe and danger zones are presented and adjusted on the display in real-time as the camera equipped surgical tool and the one or more surgical instruments move within the surgical site. A given zone may be pre-defined to have a particular 2D and/or 3D shape, or its shape may be drawn in real-time during the surgery. But, that initial depiction of the scope of the zone may not be appropriate and may need to be adjusted as the camera and/or instrument(s) are moved within the site. So, the system can be configured to permit that zone to appear and/or change shape on the screen in real time, either automatically or manually or with a tap of the display, to align with the live video feed of the site and accurately indicate presence and/or position, orientation, and other parameters of the instrument. Being already calibrated to the robot, the system can update the depiction of the zones and retain their accuracy relative to the instrument. At some points during a given procedure, the depiction of a given zone may go completely out of view from the screen, while others may emerge on the screen later in the procedure as the camera and instrument(s) progress through a given surgical site.

Operating within a system that can indicate both safe and danger zones and adjust their depiction on the screen in real-time, can permit a surgeon to operate within a safe region of the surgical site as the instrument moves along, and provide the opportunity to adjust the path and/or movement of the surgical instrument in real-time, if needed. For example, if the surgeon encounters an unexpected complication in a given location (e.g., if the anatomical region unexpectedly turns out to be more difficult to penetrate), the surgeon can opt to deviate from the then-current safe zone to steer around the problematic zone. As that steering is done, one or more danger zones may be identified enroute (either automatically or manually) to guide the instrument away from oncoming dangerous or sensitive areas of the site. The safe and danger zones may adjust as the instrument moves through the site, optionally changing shape (automatically or manually) enroute. As the instrument travels off the initial path, the depiction of the zones can adjust to provide real-time, accurate visibility for safer passage down the revised path.

Embodiments disclosed herein provide real time feedback regarding the position of the surgical tools to ensure that swift and appropriate action can be taken without delay. For example, in some implementations, immediate audio and/or visual feedback is provided when instruments deviate into a danger zone or out of a safe zone, thereby enabling surgeons to quickly implement necessary steps to revert the instrument to a safer place, to better ensure patient safety.

FIG. 1A is a high-level schematic illustration of a minimally invasive surgical system 100 designed to implement a real-time system for providing graphical depiction of one or more safe and danger zones, according to some embodiments disclosed herein. The surgical system includes a camera equipped surgical tool 140 that provides a vision-based live tracking and livestream 121 of a surgical site upon insertion into the surgical site. The camera equipped surgical tool 140 may be inserted into the surgical site via an incision site 145 and may provide the livestream during all or a portion of its time within the site. The camera equipped surgical tool 140 can be any suitable camera equipped surgical tool known and available in the art. For example, the camera equipped surgical tool 140 may be a laparoscopic camera, such as a laparoscopic camera used by a robotic surgical system. The camera equipped surgical tool 140 is coupled with a display 120 that receives and displays the livestream 121 as well as a computerized tracking system 160 that receives and analyzes the livestream 121 of the surgical site 110 provided by the camera equipped surgical tool 140.

The computerized tracking system 160 has a processor 161 coupled with the display 120. The processor 161 can be a processor of a digital circuitry and hardware 190 that can be used with, incorporated in, or fully or partially included in a minimally invasive surgical system according to the embodiments disclosed herein. Generally, the functions of the processor 161 may be carried out and implemented by any suitable computer system and/or in digital circuitry or computer hardware, and the processor 161 can implement and/or control the various functions and methods described herein.

The processor 161 monitors the operation of various components of the minimally invasive surgical system, sends and/or receives signals regarding the operation of the system, and/or control the operation of the system. For example, the processor 161 collects or receives information and data including an indication designating at least one portion 129 of the surgical site displayed in the livestream 121 of the surgical site 110 as an unsafe operating region (or a safe region), defines a three-dimensional zone surrounding the operating region, and collects and receives confirmation of the defined three-dimensional zone. The processor 161 executes instructions that identify the defined zone, for example as being a safe zone, a danger zone, a no-fly zone, a dissection zone, etc. If designated as a danger zone, the processor considers the designated zone as an area in which the presence of surgical instruments is unsafe.

The processor 161 is further configured to control, monitor, and/or carry out various functions needed for control, analysis, interpretation, tracking, and reporting of information and data collected by the system 100. For example, the processor 161 tracks movement of a surgical instrument inserted into the surgical site and in an event the surgical instrument moves in a vicinity of a three-dimensional danger zone or moves out of a three-dimensional safe zone (or toward a boundary thereof), issues a warning.

The computerized tracking system 160 and the display 120 can be coupled to each other and/or the camera equipped surgical tool 140 via any suitable connections 141, 141', 141''' available in the art. For example, the connections 141, 141', 141" between the computerized tracking system 160 and the display 120 and/or the camera equipped surgical tool 140 can be established via wired or wireless communications protocols including WIFI and Bluetooth communications schemes.

The processor 160 is connected to a main memory 162 and configured to receive instructions from the main memory 162. The processor 160 also comprises a central processing unit (CPU) 164 that includes processing circuitry configured to manipulate the instructions received from the main memory 162 and execute various instructions. The CPU 164 can be any suitable processing unit known in the art. For example, the CPU 164 can be a general and/or special purpose microprocessor, such as an application-specific instruction set processor, graphics processing unit, physics processing unit, digital signal processor, image processor, coprocessor, floating-point processor, network processor, and/or any other suitable processor that can be used in a digital computing circuitry. The processor can comprise at least one of a multi-core processor and a front-end processor.

Generally, the processor 160 and the CPU 164 are configured to receive instructions and data from the main memory 162 (e.g., a read-only memory or a random-access memory or both) and execute the instructions. The instructions and other data are stored in the main memory 162. In some implementations, the processor 160 and the main memory 162 are included in or supplemented by special purpose logic circuitry. The main memory 162 can be any suitable form of volatile memory, non-volatile memory, semi-volatile memory, or virtual memory included in machine-readable storage devices suitable for embodying data and computer program instructions. For example, the main memory 162 can comprise magnetic disks (e.g., internal or removable disks), magneto-optical disks, one or more of a semiconductor memory device (e.g., EPROM or EEPROM), flash memory, CD-ROM, and/or DVD-ROM disks.

The main memory 162 comprises an operating system 165 that is configured to implement various operating system functions. For example, the operating system 165 is responsible for controlling access to various devices, memory management, and/or implementing various functions of the system 100. Generally, the operating system 165 may be any suitable system software that can manage computer hardware and software resources and provide common services for computer programs.

The main memory 162 can also be connected to a cache unit (not shown) configured to store copies of the data from the most frequently used main memory 162. The program codes that can be used with the embodiments disclosed herein can be implemented and written in any form of programming language, including compiled or interpreted languages, and can be deployed in any form, including as a stand-alone program or as a component, module, subroutine, or other unit suitable for use in a computing environment. A computer program can be configured to be executed on a computer, or on multiple computers, at one site or distributed across multiple sites and interconnected by a communications network, such as the Internet 1290.

The main memory 162 also holds application software 167. Specifically, the main memory 612 and application software 167 include various computer executable instructions, application software, and data structures, such as computer executable instructions and data structures that implement various aspects of the embodiments described herein. For example, main memory 162 and application software 167 include computer executable instructions, application software, and data structures, such as computer executable instructions and data structures that implement an interface (e.g., an application program interface) for receiving an indication designating a portion of the surgical site displayed in the livestream of the surgical site as an unsafe operating region, analyzing the received indication, defining a three-dimensional danger zone surrounding the unsafe operating region, and tracking movement of a surgical instrument inserted into the surgical site and issuing a warning if the surgical instrument enters the danger zone.

The display 120 can generally be any suitable 2D or 3D display available in the art, for example a Liquid Crystal Display (LCD) or a light emitting diode (LED) display, a display of a headset, a tablet, a display of a training platform (e.g., surgical training platform), or a display in eyeglasses. For example, the display 120 can be a smart and/or touch sensitive display that displays the live feed 121 from the surgical site 110, receives instructions and commands from a user, such as an indication designating an area/portion 129 of the live feed 121 of the surgical site 110 as an unsafe or safe operating zone, and forwards the received indication to the computerized tracking system 160 and the processor 161 for further analysis. For example, as detailed herein, in some implementations, the display is a touchscreen/interactive display that receives the indication from the user via the touchscreen (e.g., in response to the user touching or drawing on the screen with their finger or with a stylus and/or a similar instrument to indicate 129 the position of a unsafe or safe operating zone) and forwards this indication to the computerized tracking system 160 and the processor 161.

Figure 1B:
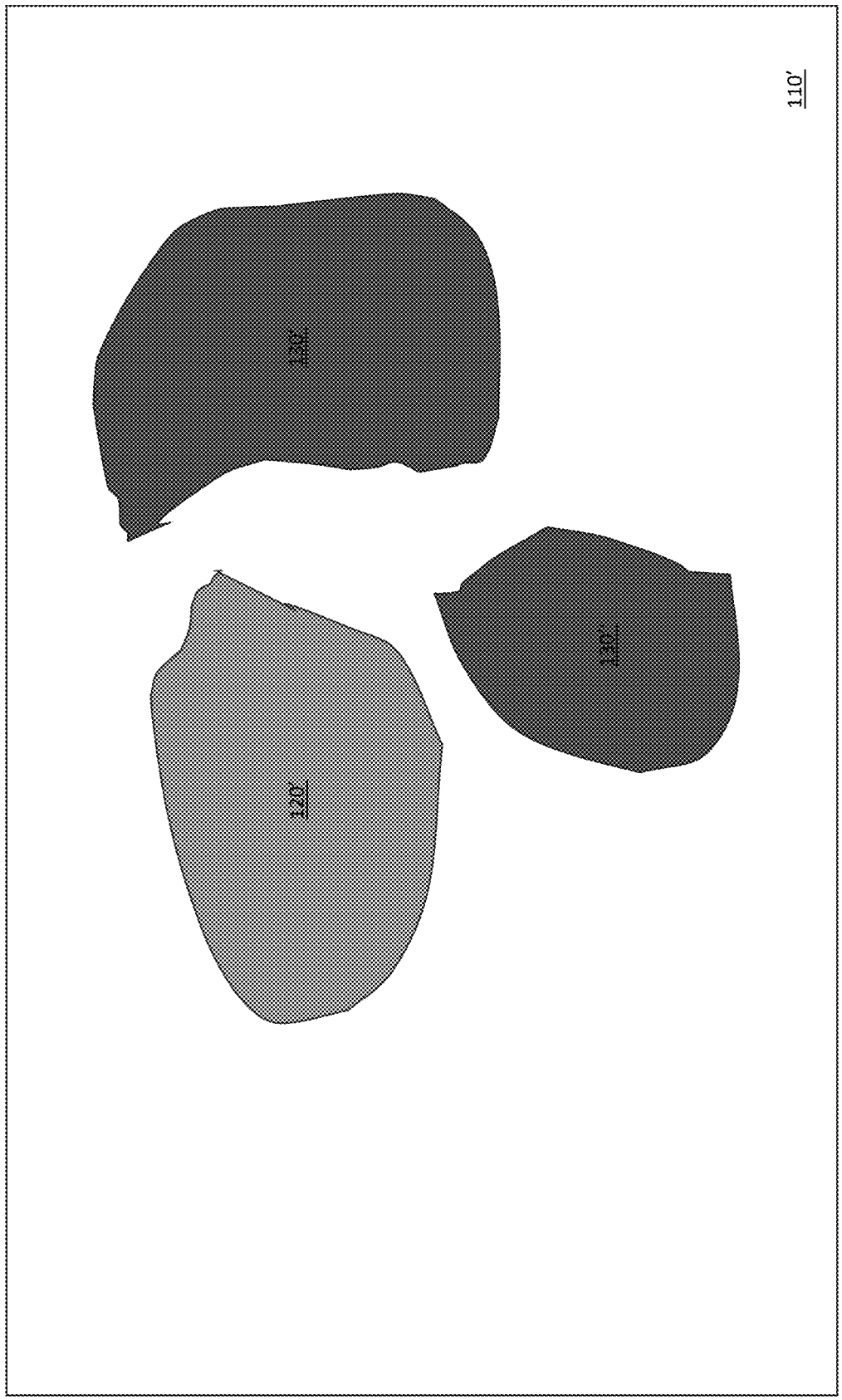
FIG. 1B is a high-level block diagram of an annotated surgical site according to some aspects disclosed herein.

The computerized tracking system 160 further comprises a database or data storage 168. The data storage or database 168 stores information and data relating to various functions and operations of the system 100. For example, the data storage 168 stores information regarding the surgical site, such as models of organs known to be present in proximity of the surgical site and/or models of two-dimensional and/or three-dimensional shapes (e.g., predefined shapes such as a sphere, a pyramid, a cone, a cube, a sphere, a cylinder, or a combination thereof). In some implementations, the computerized tracking system 160 accesses the data in the database/data storage 168 and obtains a predefined shape and/or an organ model that corresponds to the portion of the surgical site designated as a safe or unsafe surgical zone. For example, in some implementations, the computerized tracking system 160, in response to receiving an indication on the touchscreen designating a portion of the surgical site as an unsafe surgical site, accesses the database 168 to obtain one or more models of organs known to be present in the specific surgical site and determines one or more organs for designation as safe or danger zones. For example, the computerized tracking system 160, in response to designation of a certain organ/area as a safe/dissection zone, consults the database to determine one or more organs or areas known to be present in the vicinity of the organ/area designated as the safe/dissection zone and designates those one or more organs as the unsafe or danger surgical zone. The computerized tracking system relies on prior information and artificial intelligence, such as prior information obtained from the database and/or prior information learned from prior surgical tasks to designate the unsafe surgical regions. For example, referring to FIG. 1B, a surgeon may designate an area 120' within the surgical site 110' as the dissection/safe zone in which the surgical procedure would be carried out. Upon receiving an indication from the surgeon designating this area 120' as the safe zone, the computerized tracking system 160 determines the organ or body portion 120' under operation and consults the database to determine the areas of the body/organs 130', 130" expected to be in the vicinity of the organ 120' under operation. The computerized tracking system 160 may automatically label these three-dimensional regions 120' as safe and/or danger zones 130', 130" and modify the depiction of these zones (or any boundary or other aspect thereof) if/when requested/instructed by the user. Alternatively or additionally, the computerized tracking system 160 may present a list or a menu of these regions for the user to designate as safe or danger zones and/or request confirmation of automatically drawn safe and danger zones from the user. In implementations, the computerized tracking system 160 consults images of the operating site 110', such as previously obtained images of the surgical site 110' and/or previously annotated images of the surgical site 110 to draw and/or designate the safe 110' and danger 130', 130" zones. Alternatively or additionally, the computerized tracking system 160 presents three-dimensional models, including three-dimensional models of the organs or parts of the body in the surgical site 110' and/or the vicinity of the safe or danger zones 120', 130', 130" and/or three-dimensional shape models (e.g., models of spheres, pyramids, cones, cubes, cylinders, etc.) on the display 120 to the user as options for designation as the unsafe surgical zone.

Upon selection or confirmation by the user, the selected organ models are designated as safe or danger zones. As detailed below, safety and/or danger zones are presented to the user via augmented reality in real-time. For example, in certain implementations, selected models of danger zones (e.g., a predefined shape or a preselected organ model) are overlaid the real-time live feed of the surgical site and presented in an augmented reality configuration to the user.

Additionally or alternatively, the database 168 stores information regarding the surgical instruments, camera equipped surgical tools 260, and/or tools used in the operating room and/or at the surgical site 110. For example, in some implementations, the database stores information pertaining to various features of the surgical instruments and/or camera equipped surgical tools. For example, the database 168 can store information pertaining to length, width, depth, shape, type, sharpness, stiffness, and other characteristics of the surgical instrument, any relevant robotic platform components, and/or camera equipped instruments.

The computerized tracking system 160 can further be connected to various interfaces. The connection to the various interfaces can be established via a system or an input/output (I/O) interface 169 (e.g., Bluetooth, USB connector, audio interface, FireWire, interface for connecting peripheral devices, etc.). The interface 169 can further comprise a communication/network interface that provide the system 100 with a connection to a suitable communications network 190, such as the Internet. Transmission and reception of data, information, and instructions can occur over the communications network 190. Generally, the interface 169 can be any suitable interface that is configured to allow communication between computerized tracking system 160, the display 120, and the camera equipped surgical tool 140 (e.g., via any suitable communications means such as a wired or wireless communications protocols including WIFI and Bluetooth communications schemes).

Figure 2:
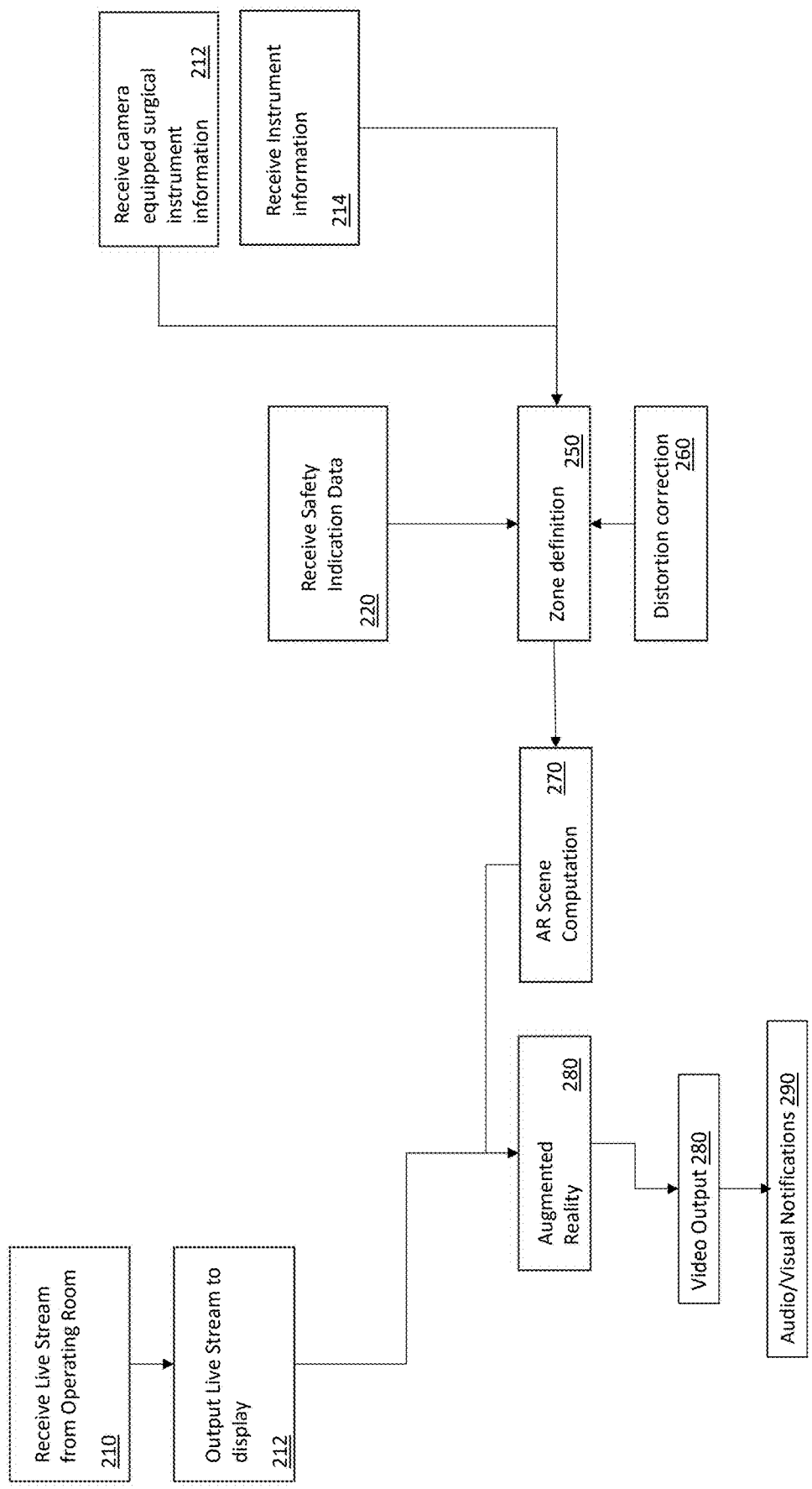
FIG. 2 is a high-level block diagram of the procedures for identifying, defining, and displaying one or more danger zones within a surgical site.
Figure 3E:
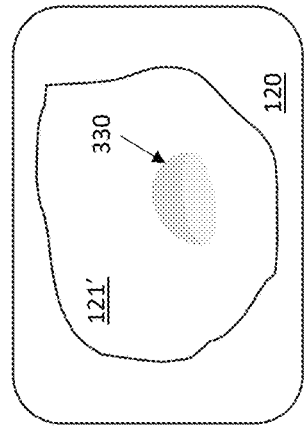
FIGS. 3A-3E are high-level schematic block diagrams of a display according to some embodiments disclosed herein.
Figure 3B:
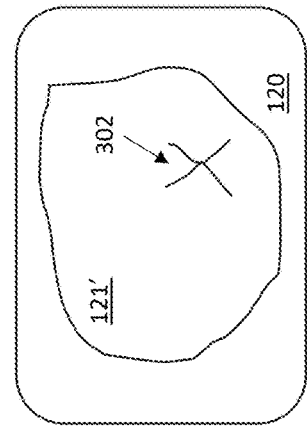
Figure 3D:
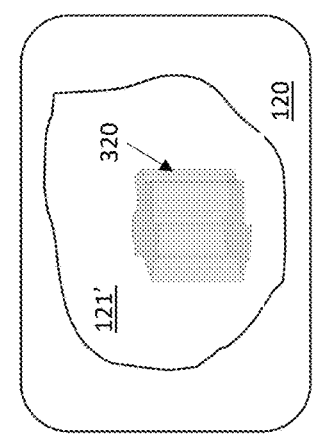
Figure 3A:
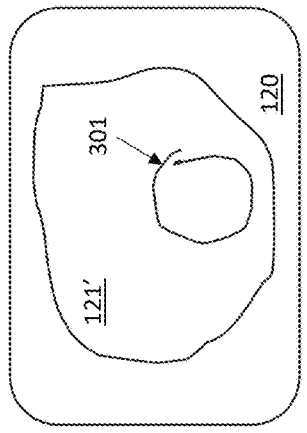
Figure 3C:
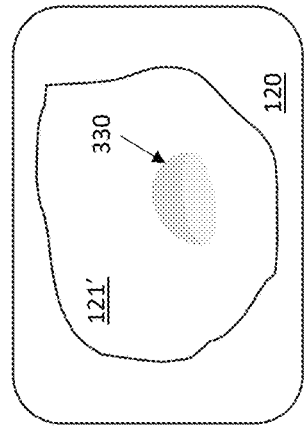

FIG. 2 is a high-level block diagram of the procedures that the computerized tracking system 160 carries out in the order to identify, define, and display one or more danger zones within a surgical site. As noted, the computerized tracking system 160 is coupled to a camera equipped surgical tool 140 and is configured to receive a live feed of the surgical site from the camera system. The camera equipped surgical tool 140 (e.g., operating room camera) transmits live video frames (livestream or live feed) of the surgical site via the communication network 190 (e.g., wired connection or wireless connection (e.g., Bluetooth®)) to the computerized tracking system 160. The computerized tracking system 160 receives the livestream (FIG. 2, box 210) as an input video frame. For example, the computerized tracking system 160 can be configured to receive the livestream by repeatedly fetching input video frames transmitted from the camera equipped surgical tool 140 via the communication network 190. In one implementation, the input video frame is fetched from a universal serial bus (USB) video capture device connected to the operating room camera unit.

Simultaneous with and/or subsequent to the reception, the computerized tracking system 160 receives an indication designating at least one portion of the surgical site displayed in the livestream of the surgical site as an unsafe or safe operating region (FIG. 2, box 220). This indication can be provided to the computerized tracking system 160 in various manners. For example, in some implementations, a surgeon or a clinician (herein collectively "surgeon" or "user") directly interacts with the computerized tracking system 160, via the display 120, to draw one or more unsafe or safe regions on the livestream of the surgical site.

FIGS. 3A-3E are high-level schematic block diagrams of a display 120 according to some embodiments disclosed herein. As explained above, the display 120 can be an interactive display that allows the surgeon to interact with the livestream 121, expand and/or manipulate the livestream, and annotate or label one or more regions as unsafe or safe regions. For example, the display 120 can be a touchscreen display that displays a livestream of the frames of the live feed of the surgical site from the camera system 140. The surgeon interacts with the livestream and manipulates the livestream by pausing and zooming on one frame 121' of the video feed 121 and focusing on the selected frame 121'. If the surgeon wishes to designate a zone within the frame as an unsafe or safe operating region, the surgeon draws a shape 301 (FIG. 3A) and/or a marker 302 (FIG. 3B) on the image.

As noted, the three-dimensional zone can be formed using a two-dimensional input device (tablet display, operating room display), for example by drawing a two-dimensional path that is projected onto or otherwise combined with a template surface (including but not limited to planar, or curved) selectable from a set of surfaces, either manually or by automatic means, or a surface corresponding to the interior of the body as calculated by a three-dimensional scanning device (e.g., optical based stereo camera, acoustic based ultrasound probe, sonar depth sensor, or other surface sensing technology) and supporting software algorithms to provide surface depth information, or a surface as calculated from previously obtained three-dimensional medical imaging data.

Additionally or alternatively, the zone can be defined by automatic recognition (by machine learning or other artificial intelligence methods) of anatomical structures in the live surgical camera feed to create two-dimensional or three-dimensional zones and comparing the position of instruments to the zone. The two-dimensional and/or three-dimensional zones are superimposed and augmented on the live video and presented on the display 120 (FIG. 2, box 212) in augmented reality. Once defined, computerized tracking system 160 actively monitors the position of the surgical instruments being manipulated within the surgical site such that upon entry into a danger zone and/or onto a boundary of a danger zone, the system does at least one of: notify the user (including but not limited to audio, visual, haptic, or other means of notification), disable the functional element, disable the motion of a computer-controlled instrument. As noted, computerized tracking system 160 relies on prior information (e.g., information stored in a database), information obtained and stored in the database from prior surgical and/or training sessions to train itself (via deep learning and artificial intelligence) to determine the location of organs and body parts and identify safe and danger zones. For example, the computerized tracking system 160 can receive a livestream of the surgical site 110, review and analyze the surgical site livestream in view of information received from the surgeon and determine the safe and danger zones via automated decision making.

Additionally or alternatively, the zones are identified via a surgical instrument and/or a surgical tool 150 at the surgical site 110. Specifically, a surgical instrument/tool 150 inserted into the surgical site 110 via an incision 115 can be used to directly hover over, scan, and/or indicate a region of surgical site as an unsafe or safe surgical region. For example, as shown in FIG. 1A, in one implementation, the surgical instrument 115 is utilized in/by a robotic surgical system 170 that is used to carry out the surgical procedure on the surgical site 110. The computerized tracking system 160 accesses the database 168 via the communication network 190 to determine identifying information regarding the surgical instrument 115 and/or the camera equipped surgical tool 140, including length, width, depth, shape, dimension, stiffness, etc. of the surgical instrument 115 or camera 140 (FIG. 2, boxes 212 and 214). Upon insertion into the surgical site, the robotic arm 175 of the robotic system 170 is used as a reference point for determining the positioning of the surgical instrument 115 within the surgical site 110. Using this reference point and in combination with the identifying information regarding the surgical instrument 115 (e.g., length, width, etc.) and the livestream feed of the surgical area, the computerized tracking system 160 determines the position and/or orientation of the tip 151 of the surgical instrument 150 within the surgical site 110. Specifically, as noted, the robotic arm is pre-calibrated and/or is quickly calibrated in order to provide the computerized tracking system 160 with the location and orientation of the robotic arm 175 (e.g., robotic arm graspers). Using the location and orientation of the robotic arm 175 as a reference point and in combination with the identifying information regarding the surgical instrument 115 (e.g., length, width, etc.), the computerized tracking system 160 determines the position and/or orientation of the tip 151 of the surgical instrument 150 within the surgical site 110. Once the location of the tip 151 of the surgical instrument 150 is determined, the computerized tracking system 160 tracks the movement of the tip 150 within the surgical site and obtains information (i.e., the indication) about any portion of the surgical zone that the user (robotic surgical system user) wishes to label as an unsafe or safe surgical region. For example, the computerized tracking system 160 can define a vector or ray corresponding to the location and orientation of surgical instrument and project the vector or ray to the location of the surface of the surgical site 155. This vector and/or ray is used to track the movements of the surgical instrument within the surgical site. In one implementation, the surgical instrument 150 comprises a surgical probe.

The instrument tracking data and the instrument length measurements are used to calculate the instrument tip position for each logic loop, beginning with a captured camera frame and tracking data corresponding to that moment in time.

In some implementations, a camera 180 is coupled with the computerized tracking system 160. The camera 180 can be a camera of the robotic surgical system 170 and the robotic system can be pre-calibrated for operation with the camera 180 (e.g., during manufacture such that no operating room calibration is needed). The camera 180 is configured to obtain one or more images and/or a live feed of the surgical area. The computerized tracking system 160 receives the images obtained by the camera 180 and analyzes the images (e.g., using the location, angle, length, and orientation of the robotic arm 175, the location of the incision 145 through which the surgical camera 140 is inserted, the location of the incision 155 where the surgical instrument 155 is inserted, as well as information known about the size and shape of the surgical instrument 155 and/or the size and shape of the surgical camera 140 to track the surgical instrument 150 within the surgical site 110. Using that information, the system can quickly track the position, orientation and other parameters of the robot's arm and the surgical instrument within the surgical site as indicated in the video feed and can display that information (within the feed) for viewing in real time by the surgeon. Based on that viewed information, the surgeon can provide inputs via the display (e.g., via touch screen or via voice or eye control or hand gestures) to identify various zones within the site and indicate, on the display, the intended and danger zones. For a given zone, that indication can be done, for example, by drawing a partial or complete zone boundary about a depicted region on the touch screen, or by depicting a point on the touchscreen that is then auto filled into a multi-dimensional zone.

In some implementations, data are tracked using 4×4 transformation matrices that contain the position and orientation of the reference point used to track the surgical instrument 115.

Referring back to FIG. 2, upon receiving the indication, the computerized tracking system 160 proceeds to define one or more safety and/or the danger zones within the surgical site 110 (FIG. 2, box 250).

A danger zone is defined as a prism 310 (FIG. 3C), with the top being a two-dimensional shape 130. As noted, the computerized tracking system 160 may obtain the model for the two-dimensional shape from a database 168. For example, the two-dimensional shape can be a triangle, a quadrilateral, or a custom drawn polygon. As noted, the two-dimensional shape is defined by the surgeon by utilizing the surgical instrument 150 attached to the robotic arm 175 to point to boundary portions of the danger zone (for example, to corner points or areas, forming a shaped boundary, such as a triangle or quadrilateral) or drawing around the perimeter of the area that should not be touched (e.g., a custom drawn polygon 320 (FIG. 3D)). Alternatively or additionally, as noted above, the danger zone can be indicated directly on the screen of the display 120 by identifying (e.g., by drawing) a marker 302 or by identifying (e.g., by drawing) a border or other region around the perimeter 301 of the area that should not be touched.

The computerized tracking system 160 receives and analyzes the drawn shape and extends the two-dimensional shape (e.g., by interpolation) for a predetermined distance to form the prism. For example, the drawn shape can be extended in a direction perpendicular to a 2D plane that best fits the drawn shape (e.g., in the direction away from the camera lens (towards the surgical area of interest)). Alternatively, the shape may be extended in the direction of the optical axis of the camera lens, away from the camera lens (towards the surgical area of interest). In some implementations, up to four or more danger zones can be defined at any given point in time.

Further, in some implementations, the user may choose to define one or more safety zones 150 for carrying out the surgical procedure. The user can indicate the location of the safety zone 150 in a similar manner as that used to define the boundaries of the danger zone 130. In response to designating the boundaries of the safety zone, the computerized tracking system 160 defines a hemisphere 330 (FIG. 3E) with the center being the tip of the instrument used to provide the indication (i.e., the surgical instrument used to provide the indication designating the area as the safe operating region and/or the center of the area 301 and/or the marker 302 drawn on the screen by the user). In some implementations, one or more safety zones can be defined at any given point in time. The safety zones designate an intended surgical zone or a space where instruments are allowed to move and be manipulated during the surgical procedure. Surgical instruments can enter and move around this area freely.

In some implementations, computerized tracking system 160 presents the user with a menu of available shapes for the safety and/or danger zones to allow the user to select a desired shape for safety and/or danger zones. The menu of the available shapes can include shape models included in the database 168. In certain implementations, the menu comprises models of one or more organs present in the vicinity of the surgical site 110. The vicinity of the site can be pre-loaded into the memory (e.g., within a certain distance on the outside of a pre-defined boundary) or defined in real-time. As noted, these models can be included in the database 168 and extracted therefrom. Depending on the surgical site and the surgical task at hand, a user can select one or more organ models for designation as danger zones while designating other regions as safety zones. Additionally or alternatively, in some implementations, the database 168 may maintain prior images of the surgical site (e.g., prior MRI and CT scans) and use the prior images to prepare the organ models for defining danger zones.

In some implementations, in addition to designating one or more areas as safety or danger zones, a user may define one or more additional zones within the surgical site 110. For example, the user may define a dissection zone, where dissection and surgical tasks are carried out.

Referring back to FIG. 2, the three-dimensional models representing safety and danger zones (e.g., a hemisphere representing a safety zone and a prism representing a danger zone) are computed based on their respective tracking data. The corresponding augmented reality scenes corresponding to the safety and danger zones are also computed from the real-time tracking info of the camera equipped surgical tool 140 (FIG. 2, box 270). The computerized tracking system 160 intercepts the video feed to transpose the safety and danger zones over the video feed and generate an augmented reality environment that illustrates the models generated for the safety and danger zones augmented on the livestream (FIG. 2, box 280). The resulting video feed is an augmented reality video feed of the surgical site 110 that displays the designated zones augmented on the livestream of the surgical site 110.

The computerized tracking system 160 further performs distortion correction (FIG. 2, box 260) on the augmented reality livestream of the surgical site 110. A certain amount of distortion in the frames of the livestream is required because in absence of distortion, the 3D objects in the overlay (i.e., overlaid safety and danger zones) would deviate from their actual location within the input frame. In order to make these 3D overlay images appear in correct locations, the computerized tracking system 160 computes their coordinates after distortion to correct for distortion (however this approach is computationally costly). In some implementations, distortion correction is carried out via custom GPU shaders in OpenGL. Based on the coordinates of the vertices, the custom shaders compute their coordinates after distortion individually, which costs nearly no additional time due to GPU's high efficiency of floating-point computation. This method can further be scaled for augmented reality with more vertices (e.g., CT/MRI results).

The computerized tracking system 160 tracks the surgical instrument 150 within the surgical site 110 and issues a warning (FIG. 2, Box 290) if the surgical instrument enters the danger zone 130.

Figure 4A:
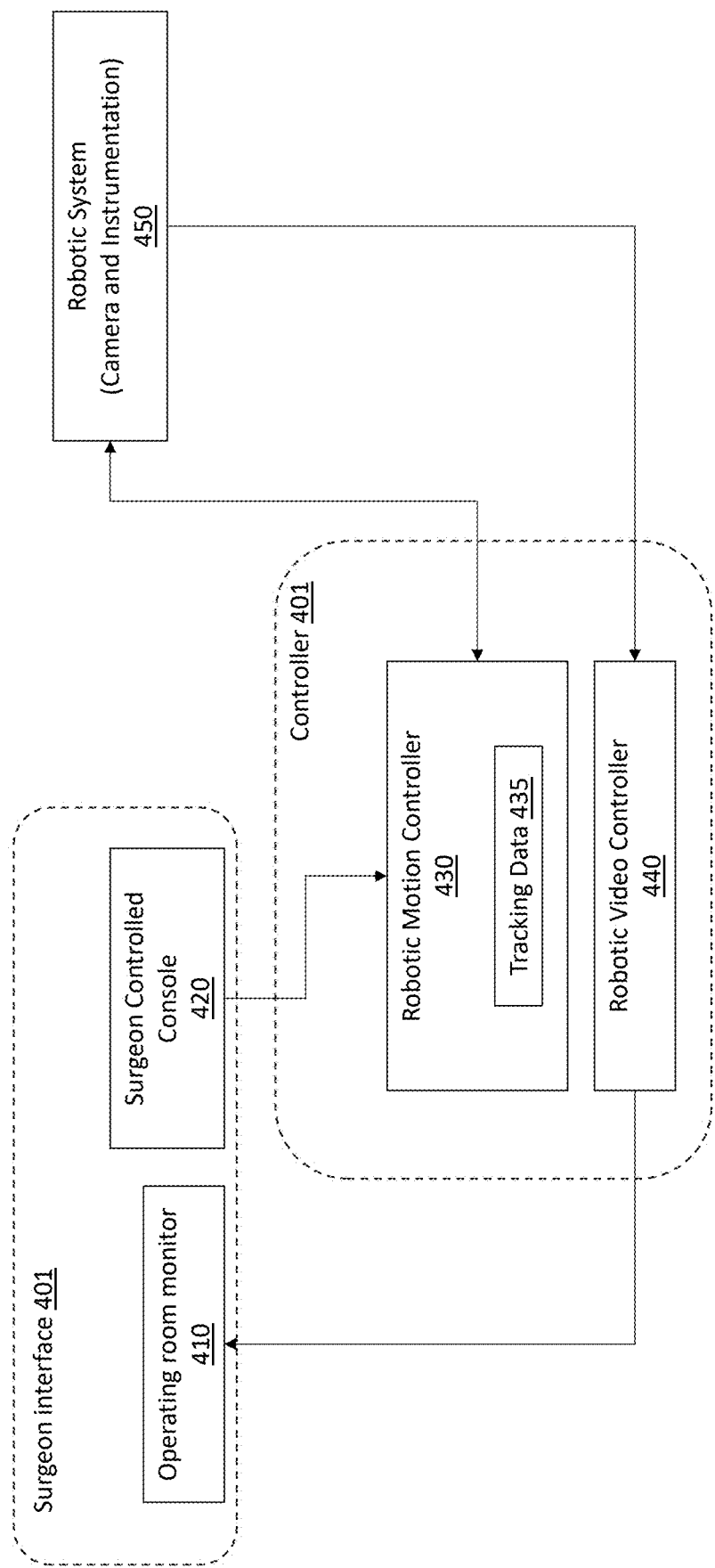
FIG. 4A is a high-level block diagram of a minimally invasive surgical system that utilizes a robotic surgical system.

FIG. 4A is a high-level block diagram of a minimally invasive surgical system that utilizes a robotic surgical system. The system includes a surgeon interface 401 that is coupled to a robotic surgical system via a controller 401. The surgeon interface 401 includes an operating room monitor 410 and a surgeon-controlled console 420. The operating room monitor 410 is coupled to the robotic system camera and instrumentation 450 via a robotic video controller 440 and is configured to receive a live feed of the operating room from the camera and instrumentation of the robotic system 450 via the robotic video controller 440. The robotic motion controller 430 is also coupled to the robotic system camera and instrumentation 450 and is configured to receive relevant information and tracking data 435 from the robotic system 450. The tracking data 435 obtained from the robotic system can include information such as one or more of surgical camera position, robotic arm length, robotic arm angle measurement, position of the robotic arm, orientation of the robotic arm, and instrument length measurement, each of these arrangements being optionally identified relative to one or more of the other. The tracking data can be stored in database 168 for use in evaluation and/or future training of users.

The surgeon utilizes the operating room monitor 410 to draw a zone (e.g., a danger zone, a safety zone, and/or a dissection zone). This information is forwarded from the surgeon interface to the controller, where it is used in combination with the tracking data to define the zones drawn by the surgeon. The robotic video controller 440 corrects for the distortion required to superimpose the define zones on the video feed from the robotic system in order to form an augmented reality stream. The generated augmented reality stream is forwarded to the operating room monitor 410 for display via the surgeon interface.

Figure 4B:
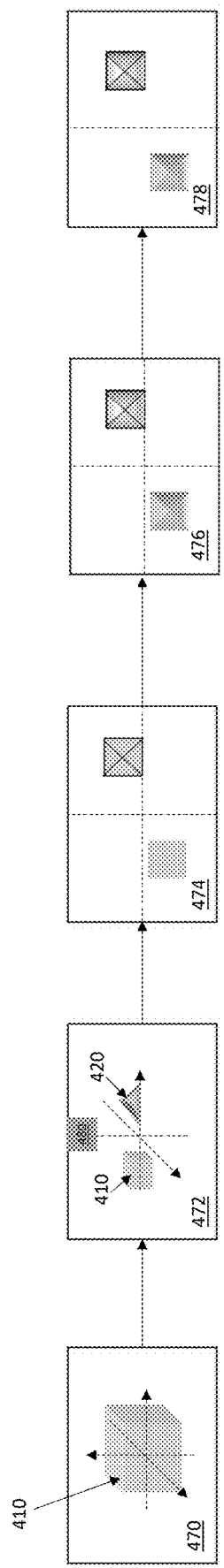
FIG. 4B is a high-level block diagram of the procedures for coordinate transformation according to some embodiments disclosed herein.

FIG. 4B is a high-level block diagram of the procedures for coordinate transformation according to some embodiments disclosed herein. As detailed herein, in order to match overlay and the input video frame, the overlay image needs to be distorted using the intrinsic parameters from the camera calibration results. Existing image overlay techniques typically first render the overlay image and then proceed to compute the distortion for all pixels. However, this existing technique is computation-intensive and results in high latency. Accordingly, embodiments disclosed herein employ GPU acceleration for real-time overlay on a moving surgical camera to reduce the requirement of hardware computing power.

Specifically, distortion is computed in vertex shaders by calculating coordinates in relation to view space and other parameters and outputting them. Distortion may be computed using one or more of the following procedures: 1) for each vertex, its coordinates in view space are calculated, 2) the distortion factor is calculated from its coordinates in view space and intrinsic parameters of the lens, 3) the coordinates after distortion are calculated from its coordinates in view space and distortion factor and output to fragment shaders.

The disclosed vertex shaders are computationally efficient and add very little overhead. The shaders can also distortion is computed in vertex shaders and can handle the rotation of an angled laparoscope with slight modification (rotating the vertices in the camera view space) if the rotation angle is provided.

FIG. 4B is a high-level view of the procedures for producing a three-dimensional zone based on instructions designating one or more portions of the surgical site as a safety and/or danger zone. As noted, the surgeon begins by designating a portion of the surgical site as a safety and/or danger zone. In response, the computerized tracking system 160 obtains local coordinates of the labeled zones relative to its local origin (FIG. 4B, box 470). For example, the computerized tracking system 160 determines the local coordinates of a designated zone (e.g., a danger zone or a safety zone 410) within the surgical site based on information relating to the dimension (length and width) of the surgical instrument, the width, depth, and/or length of the designated area (i.e., the size of the region designated and/or drawn by the surgeon). The computerized tracking system 160 transforms the local coordinates of the designated zones into global coordinates of the operating room (FIG. 4B, box 472). As indicated, the surgical room and/or the robotic surgical system 480 can comprise a camera 480 that obtains images (or a stream of images) from the surgical room. The computerized tracking system 160 can use the images (or the stream of images) to obtain global coordinates of the zones 410, 420. The computerized tracking system 160 transforms the global coordinates to view-space coordinates in such a way that each coordinate is as seen from the camera 480 or a viewer's point of view on the screen (FIG. 4B, box 474). The computerized tracking system 160 projects the view-space to clip coordinates to facilitate viewing of the zones 410, 420 on the screen on an object-by-object basis (FIG. 4B, box 476). For example, the view space can be projected to coordinates having a range between −1.0 and 1.0 to determine the vertices that are displayed on the screen. The computerized tracking system 160 transforms the clip coordinates to screen coordinates in a viewport transform process to a coordinate range defined by glViewport (FIG. 4B, box 478) for presentation to the user.

Figure 5:
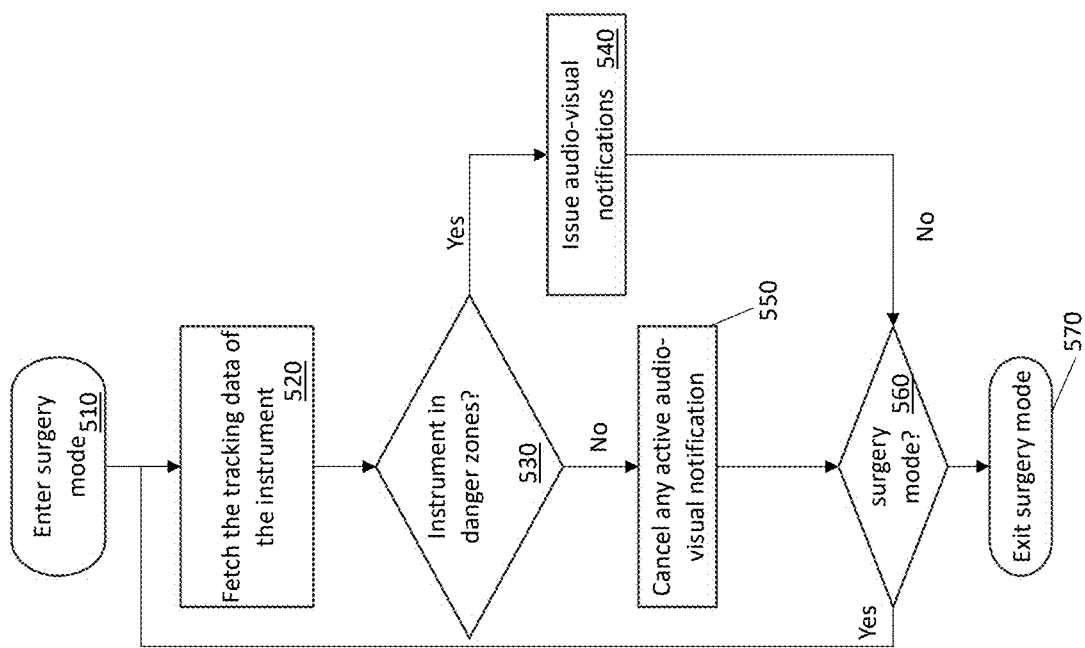
FIG. 5 illustrates a high-level block diagram of procedures for monitoring the surgical instrument within the surgical site.

FIG. 5 illustrates a high-level block diagram of procedures for monitoring the surgical instrument 150 within the surgical site 110 and issuing a warning according to aspects disclosed herein. The computerized tracking system 160 is placed in a surgery mode 510 in which zones can be defined and displayed in augmented reality on the display. For example, the computerized tracking system 160 is placed in a surgery mode 510 once a connection between the camera equipped surgical tool 140 and the computerized tracking system 160 is established (box 510). The computerized tracking system 160 obtains tracking data pertaining to location and/or orientation of the instrument within the surgical site (box 520). The computerized tracking system 160 subsequently continuously monitors the surgical site and the safety and danger zones defined within the surgical site to determine if the instrument has entered a danger zone (box 530). Upon detecting placement within a danger zone, the computerized tracking system 160 issues a visual and/or audio notification to warn the operator that the surgical tool is in the danger zone (box 540). The audio notification presented to the user is noticeable and above the moderate ambient noise present in an active operating room environment. The currently implemented audio notification consists of a set of triple beeps that repeat while the notification conditions are met.

The visual notification presented to the user is noticeable, but it does not obstruct the view of the anatomy. For example, the notification can consist of two red vertical bars positioned on the left and right edges of the operating room output display respectively. A red icon with exclamation mark may be shown in the corner of the icon corresponding to the instrument.

Alternatively or additionally, upon detection of placement within a danger zone, the computerized tracking system 160 disables and/or stops a robotic arm of a robotic surgical tool operating on the surgical site. The computerized tracking system 160 continues to monitor the position of the surgical instrument and cancels the warning (audio-visual notification) (box 550) once the instrument is outside of the danger zone. This monitoring continues (box 560) as long as the system remains in the surgery mode (box 570).

The instrument tracking data and the instrument 150 length measurements are used to calculate the instrument tip 151 position for each logic loop, beginning with a captured camera frame and tracking data corresponding to that moment in time.

The position of the instrument tip 151 in a three-dimensional space is compared to the three-dimensional volume described by drawn danger zones 130. If the instrument tip 151 is found to be within any danger zone three-dimensional volume, or the instrument is going through it, the system will issue audio and visual notifications. Otherwise there is no notification, and any active notifications will be cancelled. In either case, the augmented reality graphics and input video frame are blended as described with reference to FIG. 2, and subsequently displayed on the OR monitor.

In some implementations, the tracking the tracking information for each instrument, and the position and shape information for the defined zones are continuously written to a database in the main memory 162 to create a persisting record that may be analyzed in real-time and/or replayed and analyzed upon exiting surgery mode. The record may be analyzed to provide objective metrics such as zone entries, instrument changes, instrument tip motion (e.g., position, velocity and acceleration), as well as assessment metrics relating to user efficiency, skill, etc. The assessment metrics may be presented in the form of a report comparing current performance to that of stored results from previous procedures including those from other users. The system may further include a method for transmitting this information to another computer system via the communication network 190.

A skilled person would appreciate that although disclosed in terms of a surgical site, the surgical site may be a virtual surgical site, for example a virtual surgical site used in a virtual training module for training medical professionals and surgeons.

While the foregoing has described example embodiments, it is understood that various modifications may be made therein and that the invention or inventions disclosed herein may be implemented in various forms and embodiments, and that they may be applied in numerous applications, only some of which have been described herein.

The invention claimed is:

1. A minimally invasive surgical system, comprising:
 a camera equipped surgical tool configured to provide a livestream of a surgical site upon insertion into the surgical site;
 a computerized tracking system configured to receive the livestream of the surgical site provided by the camera equipped surgical tool, the computerized tracking system comprising:
  a display configured to display the livestream of the surgical site on the display screen; and
  a processor coupled to the display;
  a database coupled to the processor and configured to store information relating to at least one identifying characteristic of a surgical instrument used to carry out a surgical procedure on the surgical site using the minimally invasive surgical system, the at least one identifying characteristic of the surgical instrument including at least one of type, shape, length, width, depth, sharpness, and stiffness of the surgical instrument;
  a memory coupled to the processor and the database, the memory storing a non-transitory computer program that upon execution by the processor enables the processor to:
   receive, from an operator of the minimally invasive surgical system, an indication designating at least one portion of the surgical site displayed in the livestream of the surgical site as an unsafe or safe operating region in which presence of the surgical instrument is to be, respectively, avoided or introduced, the at least one portion reflecting a two-dimensional area corresponding to a specific portion of an organ or tissue within the surgical site;

define a three-dimensional zone in the livestream surrounding the two-dimensional area, the three-dimensional zone indicating, respectively, an unsafe or safe operating zone in the live stream, wherein the three-dimensional zone corresponds to the specific portion of an organ or tissue;

receive a confirmation of the defined three-dimensional zone from the operator; and track movement of the surgical instrument within the surgical site based on the at least one identifying characteristic of the surgical instrument stored in the database and provide a signal in response to detecting that the surgical instrument is moving inside, outside or near a boundary of the confirmed three-dimensional zone.

2. The system of claim 1, wherein the processor is configured to track the movement of the surgical instrument within the surgical site and provide the signal in response to detecting the surgical instrument within or near a boundary of the confirmed three-dimensional zone.

3. The system of claim 2, wherein the confirmed three-dimensional zone comprises at least one danger zone, and the signal is a warning indicating it is unsafe to move the surgical instrument into a position in the surgical site corresponding to the danger zone.

4. The system of claim 3, wherein the confirmed three-dimensional zone comprises an intended zone, and the signal indicates a safe zone where it is intended for the surgical instrument to be positioned within the intended zone.

5. The system of claim 4, wherein the processor is configured to indicate a change in the safe zone signal when the surgical instrument approaches a boundary of the intended zone and wherein the safe zone indicator is removed when the surgical instrument departs the intended zone.

6. The system of claim 3, wherein the processor is configured to activate a danger mode upon issuance of the warning and inactivate the danger mode in response to the surgical instrument moving outside of the boundary of the confirmed three-dimensional danger zone.

7. The system of claim 3, wherein the processor is configured to indicate multiple three-dimensional zones and wherein the multiple three-dimensional zones comprise a first zone indicative of a danger zone and a second zone indicative of an intended zone.

8. The system of claim 7, wherein the processor is configured to adjust at least one of dimension, position, and orientation of each of the multiple three-dimensional zones in real-time during the surgical procedure.

9. The system of claim 7, wherein the processor is configured to define the three-dimensional zone via artificial intelligence using prior information.

10. The system of claim 3, wherein the processor is further configured to augment the defined three-dimensional zone with the livestream of the surgical site and display the defined three-dimensional zone in augmented reality along with the livestream of the surgical site on the display.

11. The system of claim 3, further comprising a shape database configured to store one or more predefined shapes for defining the three-dimensional zone and wherein the dimension of the three-dimensional zone is indicated on the display screen as having a shape, wherein the one or more pre-defined shapes comprises at least one of a sphere, a pyramid, a cone, a cube, a sphere, a cylinder, or a combination thereof.

12. The system of claim 11, further comprising an organ model database configured to store one or more models of organs known to be present in proximity of the surgical site and wherein the pre-defined shape comprises at least one model from the one or more models of organs.

13. The system of claim 12, wherein the processor is configured to present a menu comprising one or more predefined shapes and receive a selection of at least one shape.

14. The system of claim 3, wherein the processor is configured to modify a three-dimensional volume or other parameters of the defined three-dimensional zone in response to receiving relevant instructions.

15. The system of claim 14, wherein the relevant instructions comprise identification of an additional unsafe or safe operating region.

16. The system of claim 14, wherein the relevant instructions are provided by actuation on the display screen.

17. The system of claim 3, wherein the processor is configured to define the three-dimensional zone based on an interpretation of a two-dimensional image.

18. The system of claim 17, wherein the processor is configured to define a two-dimensional region surrounding a marker on the two-dimensional image and define the three-dimensional zone based the interpretation of the two-dimensional region.

19. The system of claim 18, wherein the processor is configured to define the two-dimensional region with the marker at a center of the two-dimensional region.

20. The system of claim 17, further comprising an organ image database configured to store one or more two-dimensional images of organs known to be present in proximity of the surgical site and corresponding three-dimensional models for each two-dimensional image, wherein the processor is configured to correlate the two-dimensional region to at least one image in the image database, determine a corresponding three-dimensional model for the at least one image, and define the three-dimensional danger zone using the three-dimensional model.

21. The system of claim 20, wherein at least one of the one or more two-dimensional images comprises an image previously obtained from a subject using an imaging system and the imaging system is at least one of an ultrasound system, a magnetic resonance imaging system, or a computerized tomography system.

22. The system of claim 3, wherein the processor is configured to define the three-dimensional zone in response to one or more of touchscreen actuation on the display, actuation control via eye movement, hand gestures, and voice actuation.

23. The system of claim 3, configured for integration with a robotic surgery platform comprising a robot, the robot having one or more parameters including its position, its orientation, and its physical dimension.

24. The system of claim 23, wherein the system is configured to receive input information from the robotic surgery platform indicative of the one or more parameters of the robot and integrate that information into the memory and wherein the system is configured to be calibrated to the robot based on the one or more parameters.

25. The system of claim 24, wherein the calibration occurs automatically upon integration of the system and robotic platform.

26. The system of claim 24, wherein the calibration occurs by actuation of a touch screen or divot.

27. The system of claim 24, wherein the processor is configured to use the input information in combination with real-time video feed at the surgical site to determine the three-dimensional zone.

28. The system of claim 27, wherein the calibration is based on one or more robot parameters selected from position of the robot, length of robot arm, orientation of arm, arm angle, length of tool held by the robot, profile of the tool and the processor is configured to receive updated information about the robot parameters in real-time as the instrument moves during the procedure or is otherwise adjusted.

29. The system of claim 23, wherein the processor is configured to track the movement of the surgical instrument by using the robotic system as a reference point for determining positioning of the surgical instrument within the surgical site.

30. A minimally invasive surgical system, comprising:
a camera equipped surgical tool configured to provide a livestream of a surgical site upon insertion into the surgical site;
a computerized tracking system configured to receive the livestream of the surgical site provided by the camera equipped surgical tool, the computerized tracking system comprising:
a display configured to display the livestream of the surgical site on the display screen; and
a processor coupled to the display;
a memory coupled to the processor, the memory storing a non-transitory computer program that upon execution by the processor enables the processor to:
receive, from an operator of the minimally invasive surgical system, an indication designating at least one portion of the surgical site displayed in the livestream of the surgical site as an unsafe or safe operating region, wherein the indication is provided via actuation of the display and wherein the display comprises a wearable display and the processor is configured to define the three-dimensional zone in response to at least one of eye movement and hand gesture provided by the operator of the minimally invasive surgical system while wearing the wearable display;
define a three-dimensional zone surrounding the at least one portion designated by the operator;
receive a confirmation of the defined three-dimensional zone from the operator via the wearable display; and
track movement of the surgical instrument within the surgical site based on the at least one identifying characteristic of the surgical instrument stored in the database and provide a signal upon detecting that the surgical instrument is in a vicinity of the confirmed three-dimensional zone.

\* \* \* \* \*